United States Patent
Lee et al.

(10) Patent No.: US 7,317,854 B2
(45) Date of Patent: Jan. 8, 2008

(54) WAVEGUIDE AND OPTICAL COUPLING DEVICE

(75) Inventors: Hong-seok Lee, Seongnam-si (KR); Seong-mo Hwang, Seongnam-si (KR); Young-chan Kim, Suwon-si (KR); Seung-ho Nam, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/285,280

(22) Filed: Nov. 23, 2005

(65) Prior Publication Data

US 2006/0171635 A1  Aug. 3, 2006

(30) Foreign Application Priority Data

Feb. 2, 2005  (KR) .................... 10-2005-0009744

(51) Int. Cl.
G02B 6/26   (2006.01)

(52) U.S. Cl. .......................................... 385/50; 385/43
(58) Field of Classification Search .................... None
See application file for complete search history.

(56) References Cited

U.S. PATENT DOCUMENTS

| | | | | |
|---|---|---|---|---|
| 6,445,851 | B1* | 9/2002 | Rakuljic et al. | 385/37 |
| 6,633,696 | B1* | 10/2003 | Vahala et al. | 385/27 |
| 6,891,864 | B2* | 5/2005 | Vahala et al. | 372/3 |
| 2005/0078731 | A1* | 4/2005 | Fan et al. | 372/94 |

* cited by examiner

*Primary Examiner*—Tina M. Wong
(74) *Attorney, Agent, or Firm*—Sughrue Mion, PLLC

(57) ABSTRACT

A waveguide including transmission areas which transmit an input optical signal. A coupling area is provided between the transmission areas and has a width narrower than a width of the transmission areas so that at least part of the optical signal transmitted through the transmission areas is branched to a neighboring optical member.

22 Claims, 12 Drawing Sheets

WAVEGUIDE AND OPTICAL COUPLING DEVICE

CROSS-REFERENCE TO RELATED PATENT APPLICATIONS

This application claims the benefit of Korean Patent Application No. 10-2005-0009744, filed on Feb. 2, 2005, in the Korean Intellectual Property Office, the disclosure of which is incorporated herein in its entirety by reference.

BACKGROUND OF THE INVENTION

1. Field of the Invention

The present invention relates to an ultra-small, waveguide, formed of a material having a high refractive index, for transmitting an optical signal, and to an optical coupling device employing the same, and more particularly, to a waveguide which can increase coupling by weakening a mode confine of a coupling area, and an optical coupling device employing the same 2. Description of the Related Art In general, a waveguide consists of a core and a cladding layer formed of a material having a lower refractive index than that of the core. Accordingly, an optical signal is propagated in the waveguide by total internal reflection due to the difference in the refractive index between the core and cladding layer. The waveguide propagates only an optical signal satisfying a particular condition and the optical signal satisfying the propagation condition is referred to as a mode. The size of the mode is inversely proportional to the difference in the refractive index between the core and cladding layer.

Thus, as the difference in the refractive index between the core and cladding layer increases, the size of the mode decreases so that a waveguide having a small sectional area can be designed. Also, since loss in a bent area decreases, the bending radius can be made small. For example, when the core is formed of silicon Si having a refractive index of about 3.5 and the cladding layer is formed of silica $SiO_2$ having a refractive index of about 1.5, the difference in the refractive index between the core and cladding layer is about 2.0, and an ultra-small waveguide having a sectional area in units of microns can be manufactured.

A silicon-based waveguide has a problem in that, when it is applied to an optical coupling device needing coupling such as a ring resonator filter, a waveguide filter, a directional coupler, and a waveguide modulator, coupling is weakened. That is, since the mode confined of the waveguide becomes excessive due to a wide difference in the refractive index between the core and the cladding layer or air, even when a gap between neighboring waveguides is maintained extremely narrow in units of microns, coupling is not smoothly performed. Also, since the waveguides contact each other, yield is deteriorated.

As an example of an optical coupling device to overcome the above coupling problem, a micro-resonator device configured as shown in FIG. 1 has been suggested. Referring to FIG. 1, the micro-resonator device includes a ring resonator 3 and first and second waveguides 1 and 5 arranged close to the ring resonator 3. The first waveguide 1 has a linear structure and an input port 1a and an output port 1b. The first waveguide 1 is separated from the ring resonator 3 with a predetermined gap in a tangential direction of the ring resonator 3. The second waveguide 5 is a curved type and includes an input portion 5a, a curved portion 5b, a linear portion 5c, and an output port 5d. The second waveguide 5 is separated from the ring resonator 3 with a predetermined gap in a tangential direction of the ring resonator 3.

In the micro-resonator device configured as above, when the ring resonator 3 operates, the first waveguide 1 and the ring resonator 3 are coupled so that an optical signal $X_1$ input through the input port 1a passes through the ring resonator 3 and is input to the second waveguide 5. Thus, an optical signal $X_2$ is output from the output port 5d of the second waveguide 5. When the ring resonator 3 is turned off, the optical signal $X_1$ passes through the first waveguide 1 and an optical signal $X_3$ is output from the output port 1b. In the micro-resonator device, a determinant of a coupling ratio is a gap between the first waveguide 1 and the ring resonator 3. For a high coupling ratio, the gap needs to be about 0.1 μm. However, the manufacturing process to maintain a narrow gap is complicated.

SUMMARY OF THE INVENTION

To solve the above and/or other problems, the present invention provides a waveguide which is ultra-small and formed of a material having a high refractive index and an optical coupling device employing the same. Thus, by weakening the mode confine of a coupling area of the waveguide, a gap allowance is increased, and, simultaneously, coupling is increased.

According to an exemplary aspect of the present invention, a waveguide comprises transmission areas which transmit an input optical signal, and a coupling area provided between the transmission areas and having a width relatively narrower than a width of the transmission areas so that at least part of the optical signal transmitted through the transmission areas is branched to the neighboring optical member.

According to another exemplary aspect of the present invention, an optical coupling device comprises a first waveguide having first transmission areas which transmit an input optical signal and a first coupling area provided between the first transmission areas, and a second waveguide arranged to neighbor the first waveguide and having second transmission areas which transmit an input optical signal and a second coupling area provided between the second transmission areas, wherein a width of the first coupling area is relatively narrower than a width of the first transmission areas and at least part of the optical signal transmitted through the first waveguide is coupled at the first and second coupling areas and branched to the second waveguide.

BRIEF DESCRIPTION OF THE DRAWINGS

The above and other features and advantages of the present invention will become more apparent by the following detailed description of exemplary embodiments thereof with reference to the attached drawings in which.

DETAILED DESCRIPTION OF THE INVENTION

Figure 1:
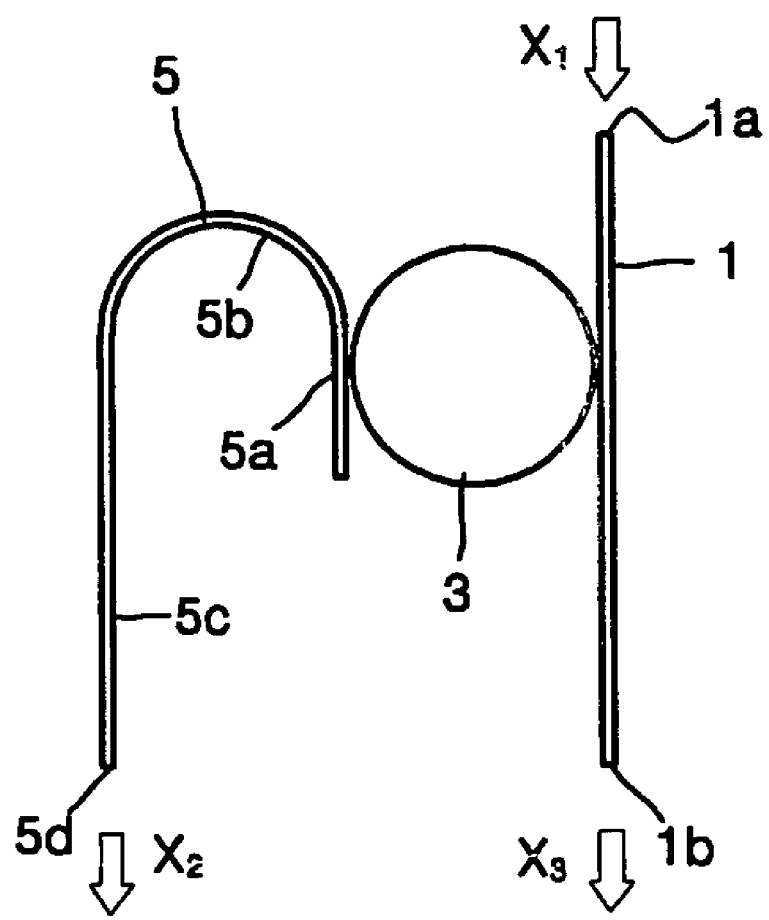
FIG. 1 illustrates a conventional micro-resonator device.
Figure 2:
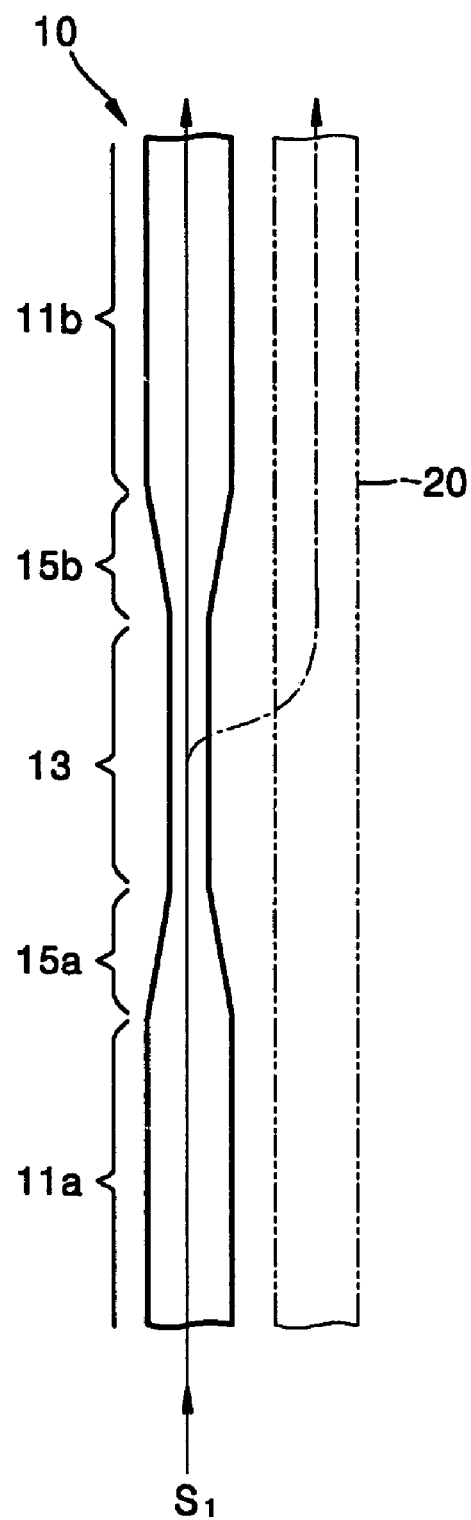
FIG. 2 is a plane view of a waveguide according to an exemplary embodiment of the present invention.
Figure 3:
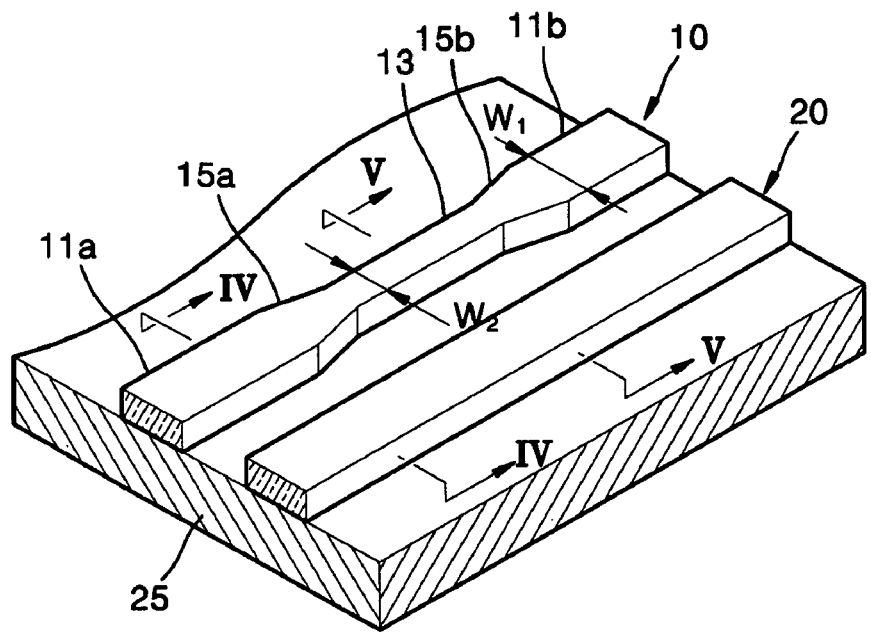
FIG. 3 is a perspective view of an optical coupling device according to a first exemplary embodiment of the present invention.
Figure 4:
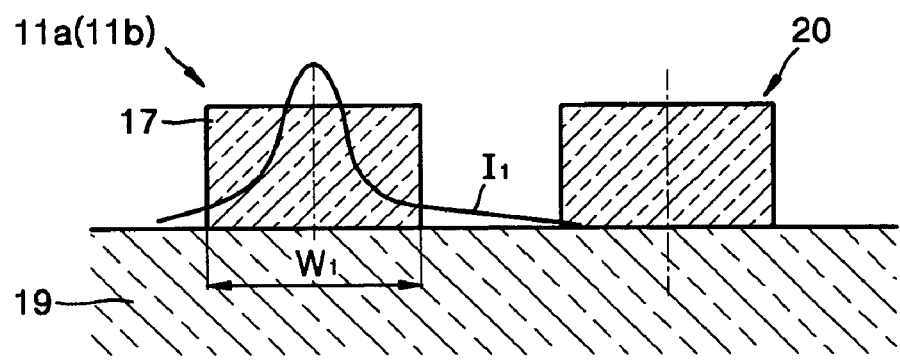
FIG. 4 is a cross-sectional view taken along the line IV-IV of FIG. 3.

Referring to FIGS. 2, 3, 4, and 5, a waveguide 10 according to an embodiment of the present invention includes transmission areas 11a and 11b and a coupling area 13 provided between the transmission areas 11a and 11b, to transmit an input optical signal S1 and simultaneously facilitate coupling with a neighboring optical member. In the present embodiment, a second waveguide 20 is provided as an example of a neighboring optical member. The waveguide 10 and the optical member can be provided on a substrate 25 parallel to each other and separated from each other. When the waveguide 10 and the optical member are integrally embodied on the substrate 25, a manufacturing cost, such as a packaging cost for hybrid integration, can be reduced.

The waveguide 10 according to the present embodiment includes a core 17 through which an optical signal is transmitted and a cladding layer 19 provided on an upper portion, a lower portion, and a side portion of the core 17. The cladding layer 19 is formed of a material having a relatively lower refractive index than that of the core 17 so that the optical signal input to the core 17 proceeds by being totally reflected inside the core 17. For example, the core 17 may be formed of an Si material and the cladding layer 19 may be formed of an $SiO_2$ material or of air. Thus, there is a difference of more than 2 in the refractive indices of the core 17 and of the cladding layer 19. In the drawings, the cladding layer 19 disposed on a lower surface of the core 17 is formed of an $SiO_2$ material and the substrate 25 may serve as the cladding layer 19. The cladding layers on the upper and side surfaces of the core 17 may be formed of air. Thus, when the optical signal passes through the transmission area 11a, the light strength distribution of the optical signal $S_1$ maintains a state in which mode confine is reinforced, as shown in graph $I_1$ of FIG. 4, and mode coupling with the second waveguide 20 hardly occurs.

The coupling area 13 is provided between the transmission areas 11a and 11b and has a width $W_2$ formed relatively narrower than a width $W_1$ of the transmission areas 11a and 11b. For example, the width $W_1$ of the transmission areas 11a and 11b is about 0.3 μm and the width $W_2$ of the coupling area 13 is about 0.25 μm.

In the waveguide 10 according to the present exemplary embodiment, taper areas 15a 15b are formed between the coupling area 13 and the transmission areas 11a and 11b, respectively. The taper areas 15a and 15b have widths that decrease from a width corresponding to the width of each of the transmission areas 11a and 11b to a width corresponding to the width of the coupling area 13.

Figure 5:
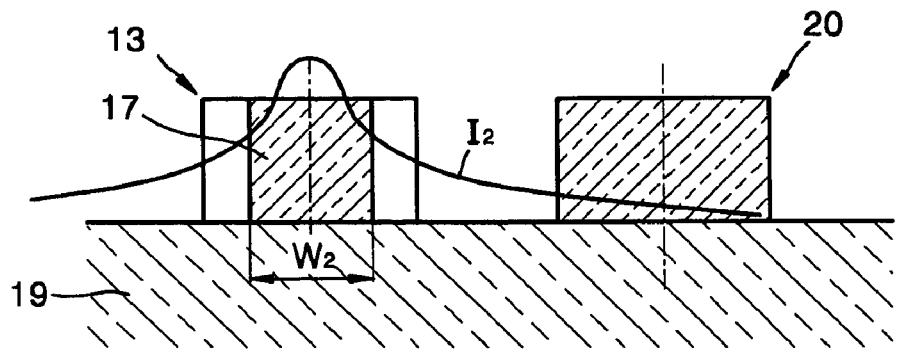
FIG. 5 is a cross-sectional view taken along the line V-V of FIG. 3.

In the waveguide 10 configured as above, the mode confine of the optical signal $S_1$, transmitted through the transmission areas 11a and 11b, is weakened at the coupling area 13. Thus, the light strength distribution of the optical signal $S_1$ at the coupling area 13 having the narrow width becomes a mode distribution like a graph $I_2$ as shown in FIG. 5 so that the waveguide 10 is coupled to the second waveguide 20. Thus, at least part of the input optical signal can be transmitted to the second waveguide 20.

Figure 6:
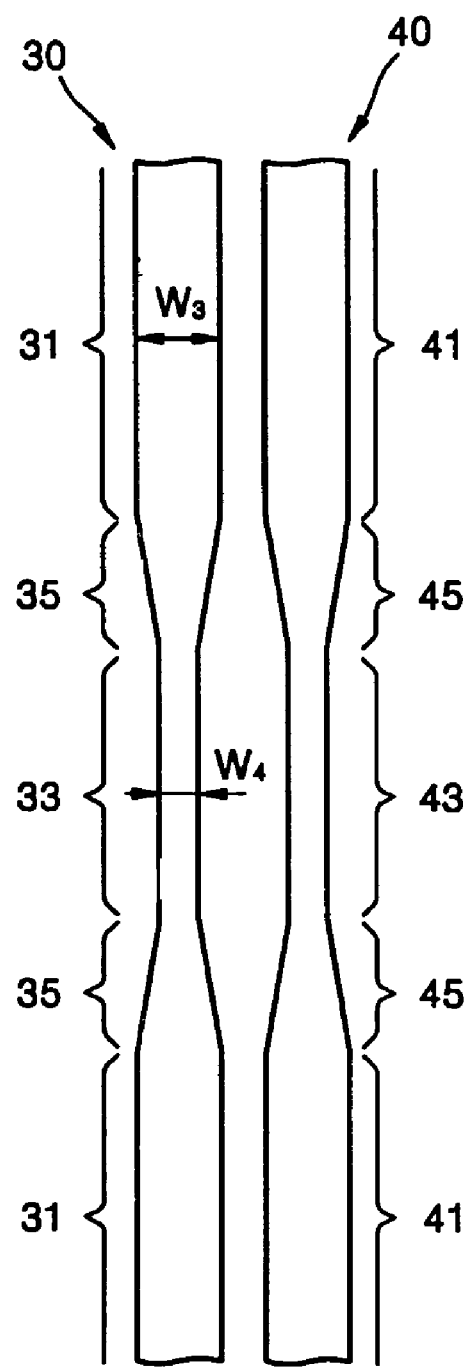
FIG. 6 illustrates an optical coupling device according to a second exemplary embodiment of the present invention.

FIG. 6 illustrates an optical coupling device according to a second exemplary embodiment of the present invention. Referring to FIG. 6, an optical coupling device according to the second exemplary embodiment includes first and second waveguides 30 and 40 arranged to be neighbored with each other and coupled at a particular portion. The first waveguide 30 includes first transmission areas 31 which transmit an input optical signal and a first coupling area 33 provided between the first transmission areas 31. A width $W_4$ of the first coupling area 33 is relatively narrower than a width $W_3$ of the first transmission areas 31. First taper areas 35 are provided between the first transmission areas 31 and the first coupling area 33. The first taper areas 35 have a width gradually narrowing from the first transmission areas 31 to the first coupling area 33.

Since the first waveguide 30 has substantially the same configuration as that of the waveguide 10 according to the first exemplary embodiment, a detailed description thereof will be omitted herein.

In the above first waveguide 30, including the first coupling area 33 having a relatively narrower width, the mode confine is weak at the first coupling area 33, and the first waveguide 30 is coupled with the second waveguide 40 at the first coupling area 33. Thus, at least part of the optical signal transmitted through the first waveguide 30 can be transmitted to the second waveguide 40.

The second waveguide 40 includes second transmission areas 41 through which an input optical signal is transmitted and a second coupling area 43 provided between the second transmission areas 41. The width of the second coupling area 43 is relatively narrower than the width of the second transmission areas 41. Second taper areas 45 are provided between the second transmission areas 41 and the second coupling area 43. The second taper areas 45 have a width gradually narrowing from the second transmission areas 41 to the second coupling area 43.

In the above second waveguide 40 including the second coupling area 43, the mode confine is weak at the second coupling area 43, and the second waveguide 40 is coupled with the first waveguide 30 at the second coupling area 43. Thus, at least part of the optical signal transmitted through the second waveguide 40 can be transmitted to the first waveguide 30 so that a range of the application thereof can be increased. Since the second waveguide 40 has substantially the same configuration as that of the first waveguide 30, a detailed description thereof will be omitted herein.

Figure 7:
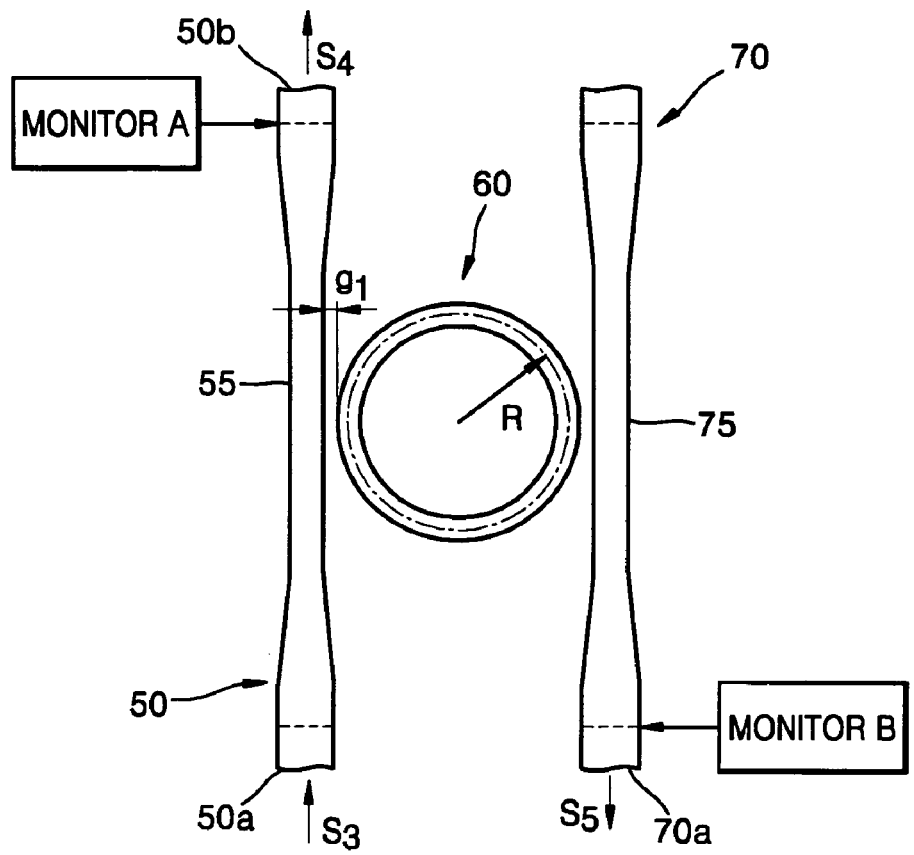
FIG. 7 illustrates an optical coupling device according to a third exemplary embodiment of the present invention.

FIG. 7 illustrates an optical coupling device according to a third exemplary embodiment of the present invention. Referring to FIG. 7, an optical coupling device according to the present exemplary embodiment includes first and second waveguides 50 and 70 and a ring resonator 60 having a radius R. The first and second waveguides 50 and 70 include first and second coupling areas 55 and 75, respectively. Since the first and second waveguides 50 and 70 have substantially the same structures as those of the first and second waveguides 30 and 40 of the optical coupling device according to the second exemplary embodiment, detailed descriptions thereof will be omitted herein.

The ring resonator 60 is arranged between the fist and second coupling areas 55 and 75 and transmits at least part of the optical signal transmitted through the first waveguide 50 to the second waveguide 70. A minimum gap $g_1$ between the first waveguide 50 and the ring resonator 60 is about 0.2 through 0.4 μm and can be set relatively wider than the conventional ring resonator shown in FIG. 1.

Monitors A and B are installed in the vicinity of an output end 50b of the first waveguide 50 and an output end 70a of the second waveguide 70, respectively. When an optical signal $S_3$ is input to an input end 50a of the first waveguide 50, optical signals $S_4$ and $S_5$ output from the output ends 50b and 70a, respectively, are measured through the monitors A and B so that it can be seen that a coupling efficiency or a bandwidth is greatly improved compared to that of the conventional ring resonator structure, which will be described later.

Figure 8:
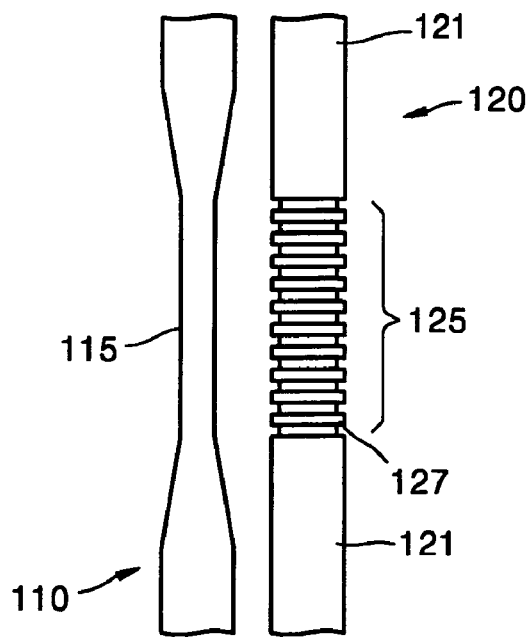
FIG. 8 illustrates an optical coupling device according to a fourth exemplary embodiment of the present invention.

FIG. 8 illustrates an optical coupling device according to a fourth exemplary embodiment of the present invention. Referring to FIG. 8, the optical coupling device according to the present exemplary embodiment includes first and second waveguides 110 and 120 having first and second coupling areas 115 and 125, respectively. The first waveguide 110 has substantially the same structure and function as the first waveguide 30 of the optical coupling device according to the second exemplary embodiment so that a detailed description thereof will be omitted herein.

In the second waveguide 120, the width of the second coupling area 125 is substantially the same as that of second transmission areas 121. A Bragg grating filter 127 which passes only an optical signal having a predetermined wavelength is provided in the second coupling area 125. When the Bragg grating filter 127 is included, only light of a particular wavelength proceeds through the second waveguide 120 during the coupling of between the first and second waveguides 110 and 120. Thus, the optical coupling device configured as above can be used as a directional coupler. Since the second waveguide 120, except for the above-described Bragg grating structure, is substantially the same structure as the second waveguide 40 of FIG. 6 according to the second exemplary embodiment, a detailed description thereof will be omitted herein.

Figure 9:
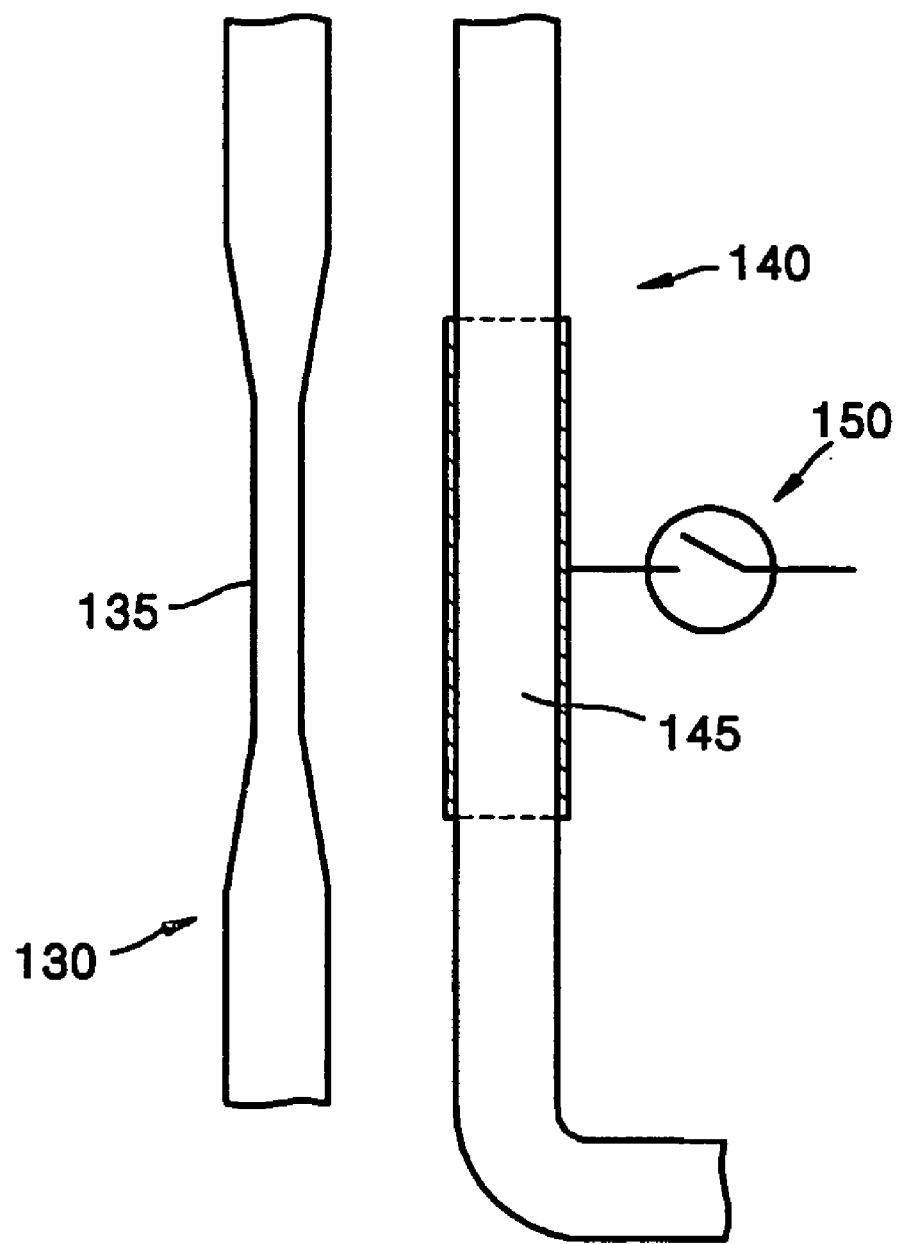
FIG. 9 illustrates an optical coupling device according to a fifth exemplary embodiment of the present invention.

FIG. 9 illustrates an optical coupling device according to a fifth exemplary embodiment of the present invention. Referring to FIG. 9, the optical coupling device according to the present exemplary embodiment includes first and second waveguides 130 and 140 including first and second coupling areas 135 and 145, respectively, and a modulator 150 provided in the vicinity of the second waveguide 140. The first waveguide 130 has substantially the same structure and function as the first waveguide 30 of the optical coupling device according to the second exemplary embodiment. Thus, at least part of an optical signal transmitted through the first waveguide 130 is coupled between the first coupling area 135 and the second coupling area 145 and is transmitted to the second waveguide 140. The modulator 150 varies a refractive index of the second waveguide 140 according to the selective application of an electric signal so that the optical signal transmitted to the second waveguide 140 can be modulated.

Figure 10A:
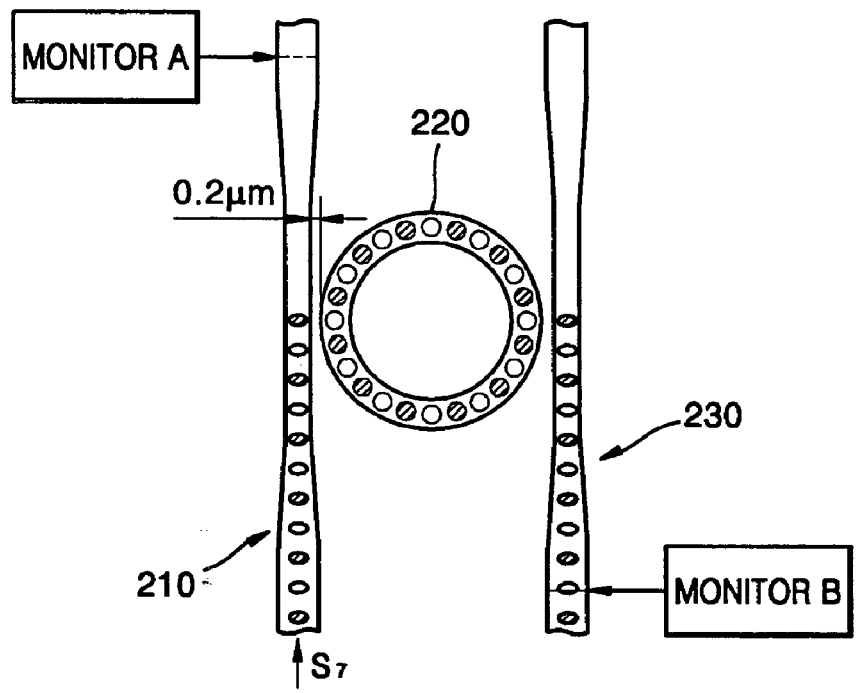
FIGS. 10A and 11A show optical signal transmission distributions when light having a continuous wavelength of 1.567 μm is used in a state in which a gap between a first waveguide and a ring resonator is maintained at 0.2 μm in an exemplary embodiment of the present invention and a comparative example, respectively.

The ring resonator type optical coupling device according to the third exemplary embodiment of the present invention and a conventional ring resonator type optical coupling device are compared with reference to FIGS. 10A through 15B. FIG. 10A shows an optical signal transmission distribution when light having a continuous wavelength of 1.567 μm is used as an input optical signal $S_7$ in a state in which a gap between a first waveguide 210 and a ring resonator 220 is maintained at 0.2 μm according to the present exemplary embodiment of the present invention. In FIG. 10A, the width of the transmission area of each of the first waveguide 210 and the second waveguide 230, the radius of the ring resonator 220, and the width of the coupling area are set to be about 0.3 μm, 1.7 μm, and 0.25 μm, respectively.

Figure 10B:
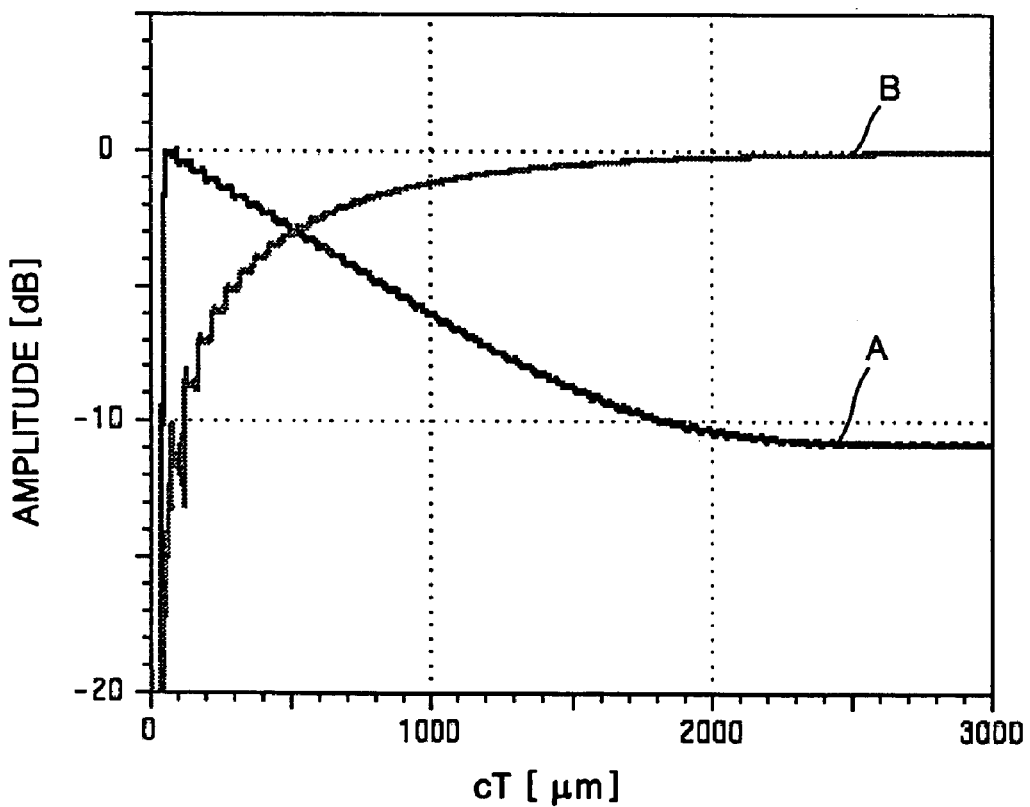
FIGS. 10B and 11B are graphs showing the distributions of amplitude according to a change of time for the cases shown in FIGS. 10A and 11A, respectively.

Referring to FIG. 10A, when the ring resonator 220 operates, most of the input optical signal $S_7$ proceeds toward a monitor B of the second waveguide 230 via the ring resonator 220, and hardly any of the input signal proceeds toward a monitor A of the first waveguide 210. FIG. 10B shows the distribution of the amplitude according to a change in time in this case.

In the graph shown in FIG. 10B, the unit "cT" of the horizontal axis indicates a distance obtained by multiplying time T by the velocity of light c. It can be seen that the amplitude of a signal detected by the monitor A gradually decreases under about –10 dB and the amplitude of a signal detected by the monitor B gradually increases so that almost all of the signal is detected by the monitor B.

Figure 11A:
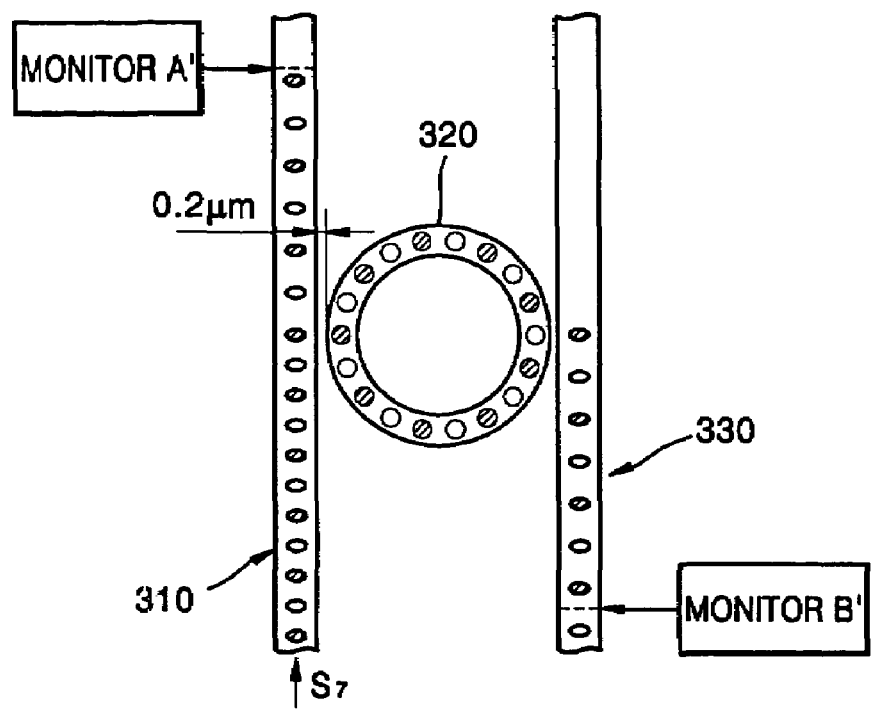

FIG. 11A shows an optical signal transmission distribution when light having a continuous wavelength of 1.567 μm is used as an input optical signal in a state in which a gap between a first waveguide 310 and a ring resonator 320 is maintained at 0.2 μm according to the comparative example. In FIG. 11A, the width of the transmission area of each of the first waveguide 310 and the second waveguide 330 and the radius of the ring resonator 320 are set to be about 0.3 μm and 1.7 μm, respectively.

Figure 11B:
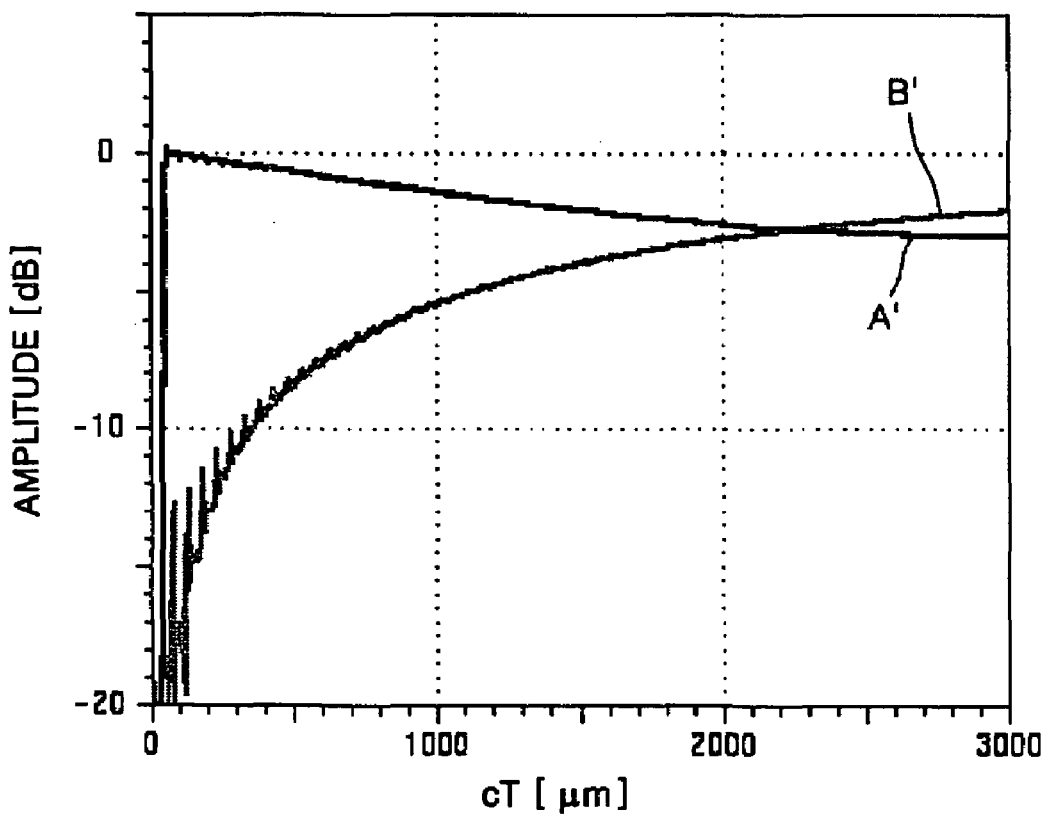

Referring to FIG. 11A, some of the input optical signal $S_7$ proceeds toward a monitor A' while part of the optical signal $S_7$ proceeds toward a monitor B' via the ring resonator 320. In this case, the distribution of amplitude according to a change in time is shown in FIG. 11B. Referring to FIG. 11B, the decrease in the amplitude of the signal detected by the monitor A' is feeble so that a high amplitude of about –3 dB is maintained at a cT value of about 3000 μm. Meanwhile, the amplitude of the signal detected by the monitor B' gradually increases and is maintained at about –2 dB. Thus, it can be seen from the above result that an optical coupling efficiency of the ring resonator type optical coupling device according to the present invention is improved compared to that of the conventional technology.

Figure 12A:
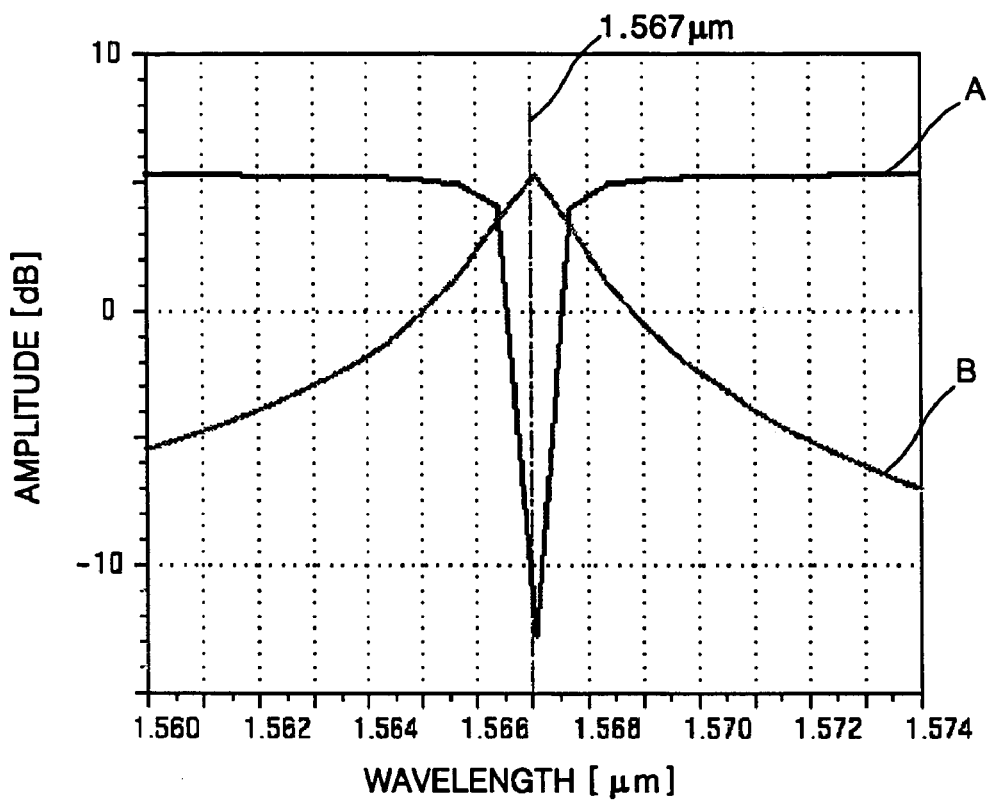
FIGS. 12A and 12B are graphs showing changes in amplitude according to a change in wavelength when impulse signals are applied to the optical coupling devices described by FIGS. 11A and 12A, respectively.
Figure 12B:
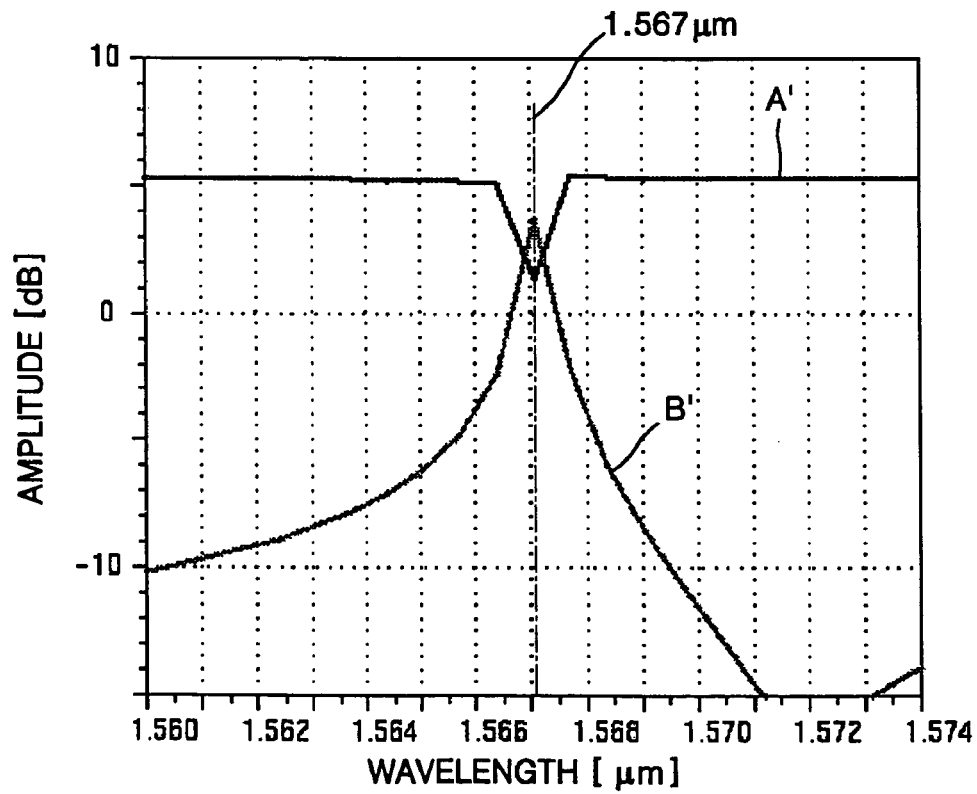

When an impulse signal is applied to the optical coupling devices shown in FIGS. 10A and 11A, the changes in amplitude according to a change in wavelength are shown in FIGS. 12A and 12B. Referring to FIGS. 12A and 12B, when the optical signal having a wavelength of 1.567 μm detected by the monitors B and B' are compared with each other, the bandwidth of a portion being coupled is greatly increased and the signals detected by the monitor B' and the monitor B are about 4 dB and 5 dB, respectively, so that it can be seen that coupling is slightly increased.

Figure 13A:
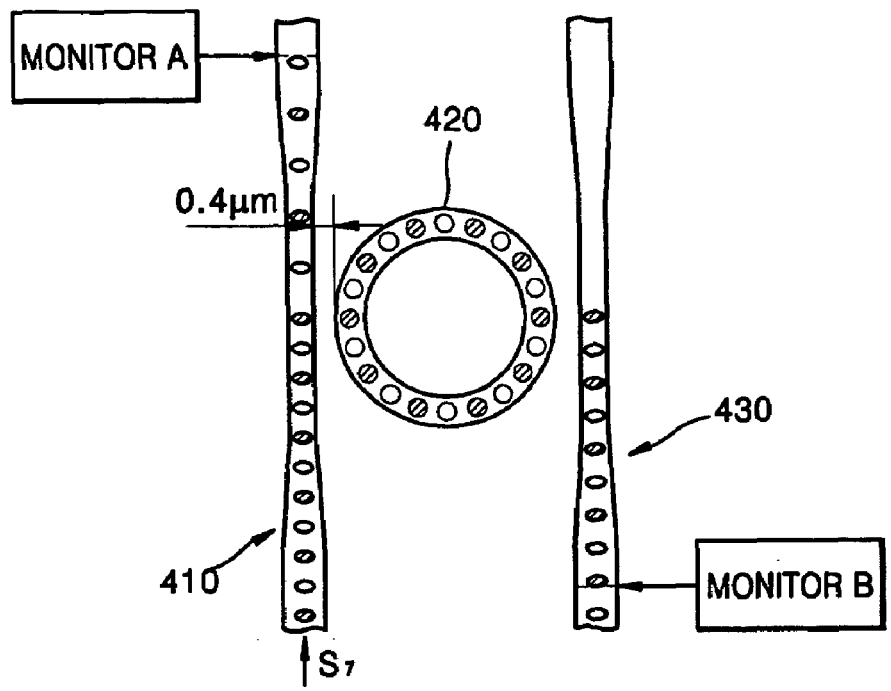
FIGS. 13A and 14A show optical signal transmission distributions when light having a continuous wavelength of 1.567 μm is used in a state in which a gap between a first waveguide and a ring resonator is maintained at 0.4 μm in an exemplary embodiment of the present invention and a comparative example, respectively.

FIG. 13A shows an optical signal transmission distribution when light having a continuous wavelength of 1.567 μm is used as the input optical signal $S_7$ in a state in which a gap between a first waveguide 410 and a ring resonator 420 is maintained at 0.4 μm according to the present exemplary embodiment of the present invention. In FIG. 13A, the width of the transmission area of each of the first and second waveguides 410 and 430, the radius of the ring resonator 420, and the width of the coupling area are set to be about 0.3 μm, 1.7 μm, and 0.25 μm, respectively.

Referring to FIG. 13A, when the ring resonator 420 operates, a considerable part of the input optical signal $S_7$ proceeds toward the monitor B of the second waveguide 430 via the ring resonator 420 while part of the signal proceeds toward the monitor A of the first waveguide 410. That is, it can be seen that the amount of the optical signal proceeding toward the monitor A increases compared to the case in which the gap between the first waveguide 410 and the ring resonator 420 is maintained at 0.2 μm.

Figure 13B:
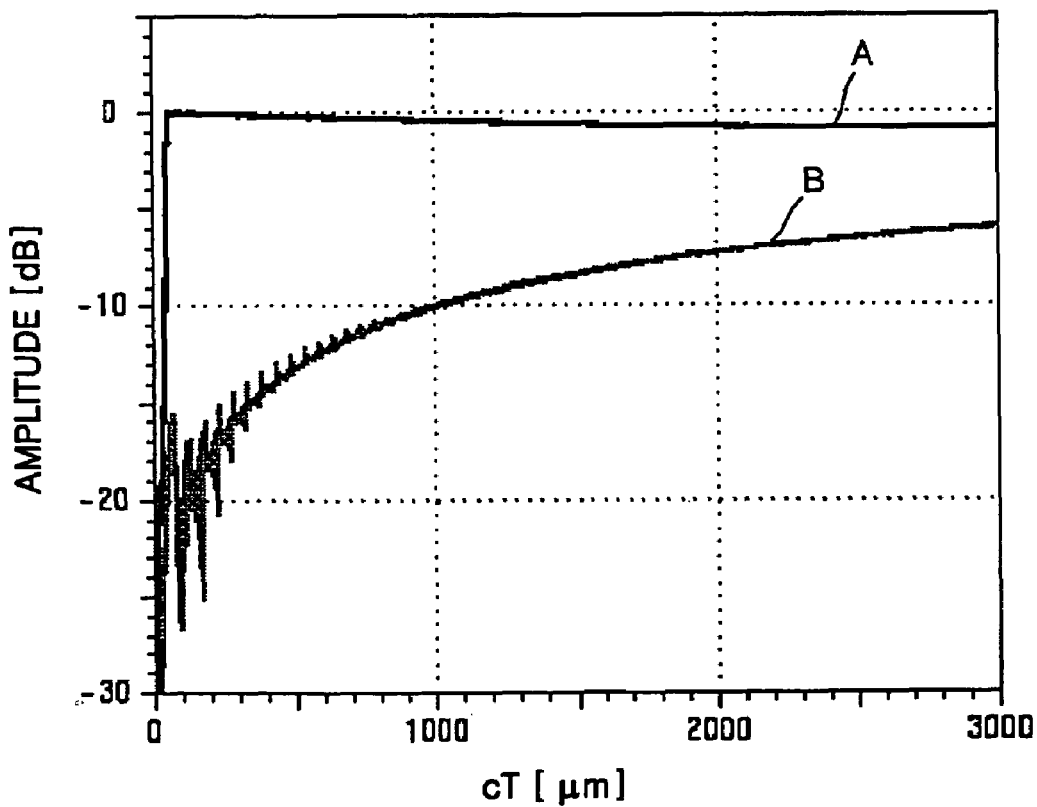
FIGS. 13B and 14B are graphs showing the distributions of amplitude according to a change of time for the cases shown in FIGS. 13A and 14A, respectively.

In this case, the distribution of amplitude according to a change in time is shown in FIG. 13B. Referring to FIG. 13B, the amplitude of the signal detected by the monitor A is maintained at about −1 dB while the amplitude of the signal detected by the monitor B gradually increases so that a signal of about −5 dB is detected by the monitor B.

Figure 14A:
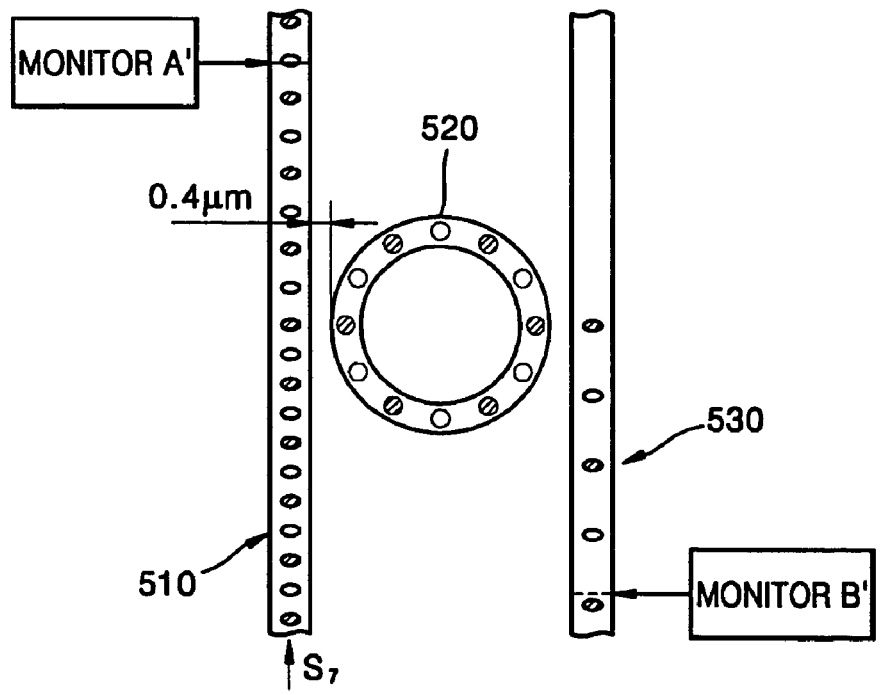

FIG. 14A shows an optical signal transmission distribution when light having a continuous wavelength of 1.567 μm is used as the input optical signal $S_7$ in a state in which a gap between a first waveguide 510 and a ring resonator 520 is maintained at 0.4 μm according to the comparative example. In FIG. 14A, the width of the transmission area of each of the first waveguide 510 and a second waveguide 530 and the radius of the ring resonator 520 are set to be about 0.3 μm and 1.7 μm, respectively.

Figure 14B:
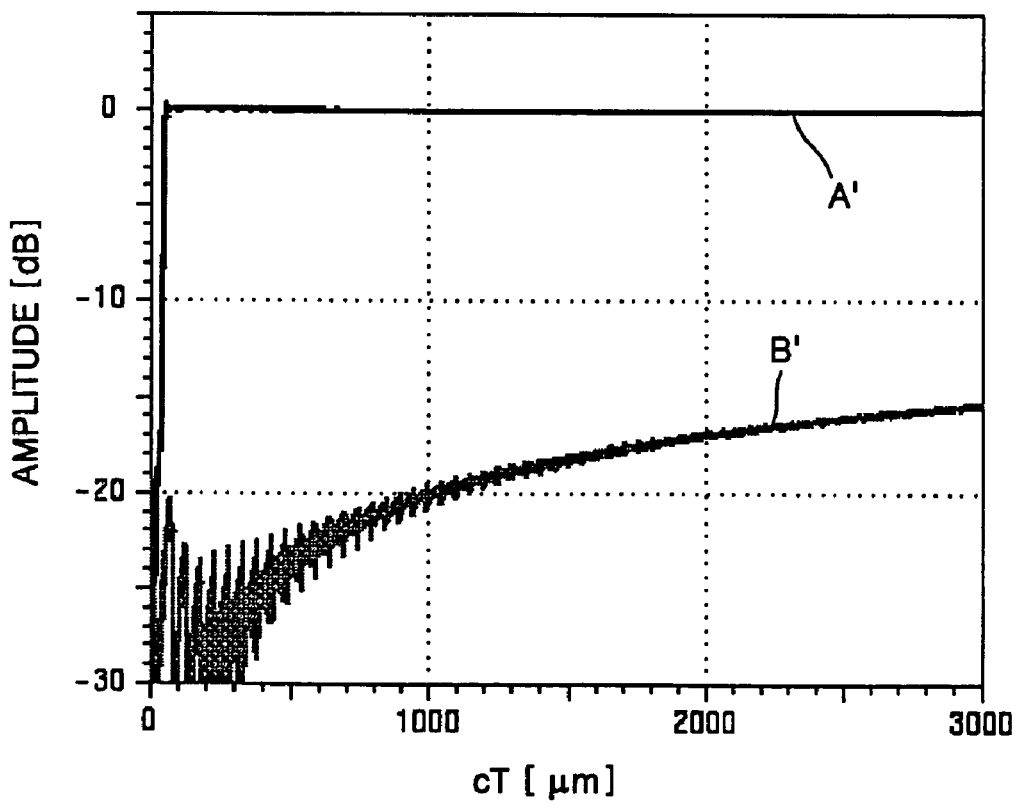

Referring to FIG. 14A, most of the input optical signal $S_7$ proceeds toward a monitor A' while a very small part of the optical signal $S_7$ proceeds toward a monitor B' via the ring resonator 520. In this case, the distribution of amplitude according to a change in time is shown in FIG. 14B. Referring to FIG. 14B, the amplitude of the signal detected by the monitor A' is maintained at a high amplitude of about 0 dB at a cT value of about 3000 μm. Meanwhile, the amplitude of the signal detected by the monitor B' gradually increases and is maintained at about −15 dB because the degree of increase thereof is small. Thus, it can be seen from the above result that, when the gap between the waveguide and the ring resonator is increased and other conditions are identical, an optical coupling efficiency of the ring resonator type optical coupling device according to the present invention is improved compared to the conventional technology.

Figure 15A:
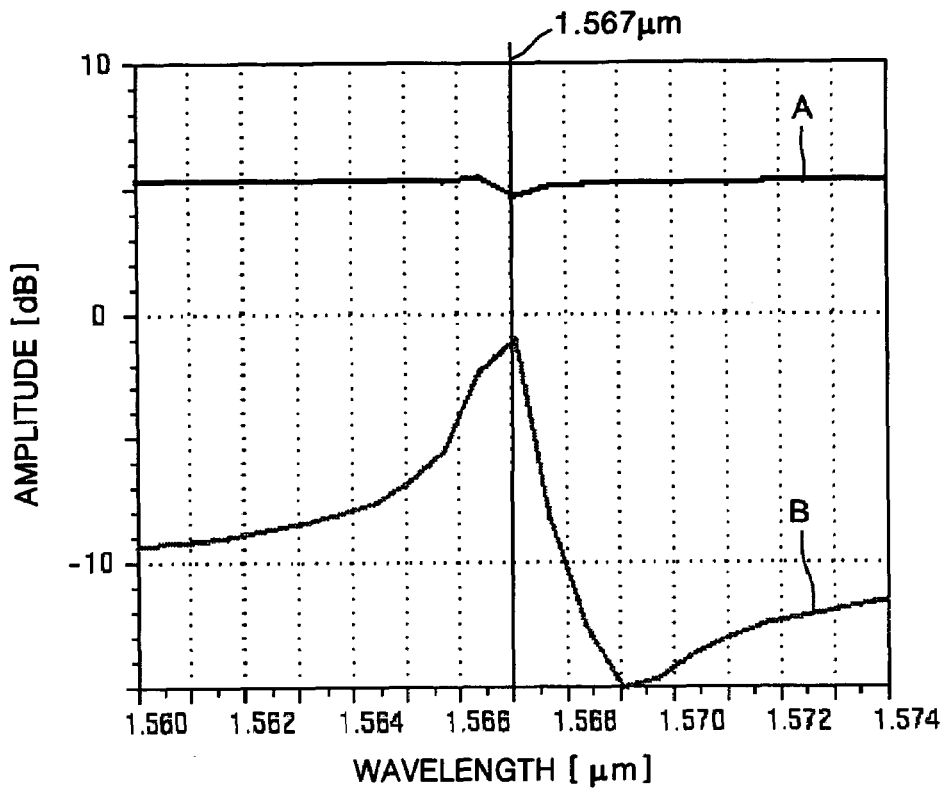
FIGS. 15A and 15B are graphs showing changes in amplitude according to a change in wavelength when impulse signals are applied to the optical coupling devices described by FIGS. 13A and 14A, respectively.
Figure 15B:
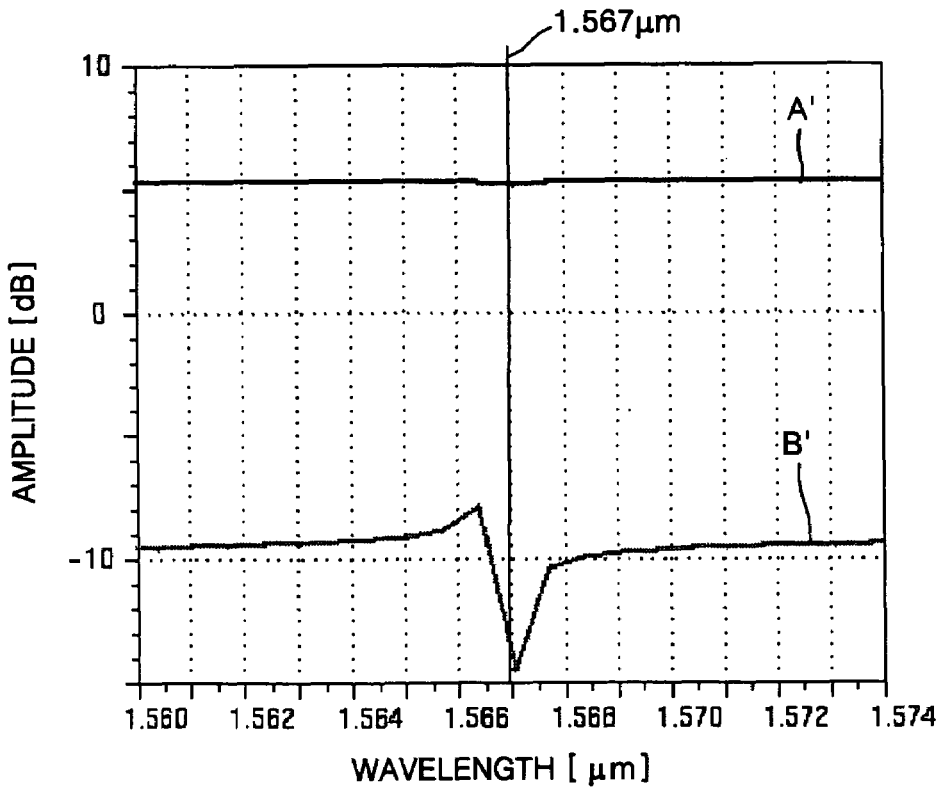

When an impulse signal is applied to the optical coupling devices shown in FIGS. 13A and 14A, the changes in amplitude according to a change in wavelength are shown in FIGS. 15A and 15B. Referring to FIGS. 15A and 15B, when the optical signal having a wavelength of 1.567 μm detected by the monitors B and B' are compared with each other, the amplitude of the signal detected by the monitor B is about −1 dB which is increased much higher than that of the signal detected by the monitor B' so that it can be seen that a coupling efficiency is remarkably improved.

As described above, in the waveguide which is ultra-small and formed of a material having a high refractive index according to the present invention and the optical coupling device employing the same, since the width of the coupling area of the waveguide is narrower than the transmission area, the mode confine of the coupling area is weakened so that coupling can be increased. Thus, when gap allowance is maintained to be wider by maintaining the gap between the waveguide and the neighboring optical device about 0.2 through 0.4 μm, a coupling efficiency is improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A waveguide comprising:
  first and second transmission areas which transmit an input optical signal; and
  a coupling area provided between the first transmission area and the second transmission area;
  wherein a width of the coupling area is less than a width of the first and second transmission areas; and
  wherein each of the first transmission area, the second transmission area, and the coupling area comprises:
    a core through which an optical signal is transmitted; and
    a cladding layer provided on an upper portion, a lower portion, and a side surface of the core, the cladding layer having a refractive index lower than a refractive index of the core; and
  wherein the coupling area weakens a mode confinement of the optical signal and at least part of the optical signal transmitted through the transmission areas is branched to a neighboring optical member;
  wherein a gap between the coupling area and the neighboring optical member is approximately equal to or greater than a width of the coupling area; and
  wherein a difference between the refractive index of the core and the refractive index of the cladding layer is 2 or more.

2. The waveguide as claimed in claim 1, further comprising:
  a first taper area provided between the first transmission area and the coupling area; and
  a second taper area provided between the coupling area and the second transmission area;
  wherein a width of the first taper area and a width of the second taper area gradually decreases from a width corresponding to a width of the first and second transmission areas to a width corresponding to a width of the coupling area.

3. The waveguide as claimed in claim 2, wherein each of the first and second taper areas comprises:
  a core through which an optical signal is transmitted; and
  a cladding layer provided on a lower portion of the core and having a refractive index lower than a refractive index of the core.

4. The waveguide as claimed in claim 1, wherein:
  the core is an Si material, the cladding layer is an $SiO_2$ material, and the upper portion and the side surface of the core are air.

5. An optical coupling device comprising:
  a first waveguide comprising at least two first transmission areas, which transmits an input optical signal, and a first coupling area disposed between the at least two first transmission areas; wherein a width of the first coupling area is less than a width of the at least two first transmission areas; and
  a second waveguide disposed adjacent to the first waveguide and comprising at least two second transmission areas which transmit an input optical signal and a second coupling area disposed between the at least two second transmission areas;

wherein each of the first and second waveguides comprises:
- a core through which an optical signal is transmitted; and
- a cladding layer provided on a lower portion of the core and having a refractive index lower than a refractive index of the core;

wherein a difference between the refractive index of the core and the refractive index of the cladding layer is 2 or more; and wherein the first coupling area weakens a mode confinement of the optical signal and at least part of the optical signal transmitted through the first waveguide is branched to the second waveguide, and a gap between the first coupling area and the second waveguide is approximately equal to or greater than a width of the first coupling area.

6. The optical coupling device as claimed in claim 5, wherein the first waveguide further comprises:
at least two first taper areas disposed between the first coupling area and the at least two first transmission areas;
wherein a width of the at least two taper areas gradually decreases from a width corresponding to a width of the first transmission areas to a width corresponding to a width of the first coupling area.

7. The optical coupling device as claimed in claim 5, wherein a width of the second coupling area is less than a width of the at least two second transmission areas.

8. The optical coupling device as claimed in claim 7, wherein the second waveguide further comprises:
at least two second taper areas disposed between the second coupling area and the at least two second transmission areas;
wherein a width of the at least two second taper areas gradually decreases from a width corresponding to a width of the at least two second transmission areas to a width corresponding to a width of the second coupling area.

9. The optical coupling device as claimed in claim 5, wherein the core of the first and second waveguides is formed of an Si material, the cladding layer is an $SiO_2$ material, and the upper portion and the side surface of the core are air.

10. The optical coupling device as claimed in claim 5, further comprising:
a resonator, disposed between the first and second coupling areas, which transmits at least part of an optical signal transmitted through the first waveguide to the second waveguide.

11. The optical coupling device as claimed in claim 10, wherein a spacing between the first waveguide and the ring resonator is about 0.2 μm -0.4 μm.

12. The optical coupling device as claimed in claim 10, wherein the first waveguide further comprises:
at least two first taper areas disposed between the first coupling area and the at least two first transmission areas;
wherein a width of the at least two taper areas gradually decreases from a width corresponding to a width of the at least two first transmission areas to a width corresponding to a width of the first coupling area.

13. The optical coupling device as claimed in claim 10, wherein a width of the second coupling area is less than a width of the at least two second transmission areas.

14. The optical coupling device as claimed in claim 13, wherein the second waveguide further comprises:
at least two second taper areas disposed between the second coupling area and the at least two second transmission areas;
wherein a width of the at least two second taper areas gradually decreases from a width corresponding to a width of the at least two second transmission areas to a width corresponding to a width of the second coupling area.

15. The optical coupling device as claimed in claim 5, wherein the second waveguide further comprises a Bragg grating type filter, disposed in the second coupling area, which transmits only an optical signal having a predetermined wavelength.

16. The optical coupling device as claimed in claim 15, wherein the first waveguide further comprises:
at least two first taper areas disposed between the first coupling area and the at least two first transmission areas;
wherein a width of the at least two first taper areas gradually decreases from a width corresponding to a width of the at least two first transmission areas to a width corresponding to a width of the first coupling area.

17. The optical coupling device as claimed in claim 15, wherein a width of the second coupling area is less than a width of the at least two second transmission areas.

18. The optical coupling device as claimed in claim 17, wherein the second waveguide further comprises:
at least two second taper areas disposed between the second coupling area and the at least two second transmission areas;
wherein a width of the at least two second taper areas gradually decreases from a width corresponding to a width of the at least two second transmission areas to a width corresponding to a width of the second coupling area.

19. The optical coupling device as claimed in claim 5, further comprising a modulator, disposed in the vicinity of the second waveguide, which varies a refractive index of the second wave guide by application of an electric signal.

20. The optical coupling device as claimed in claim 19, wherein the first waveguide further comprises:
at least two first taper areas disposed between the first coupling area and the at least two first transmission areas;
wherein a width of the at least two first taper areas gradually decreases from a width corresponding to a width of the at least two first transmission areas to a width corresponding to a width of the first coupling area.

21. The optical coupling device as claimed in claim 19, wherein a width of the second coupling area is less than a width of the at least two second transmission areas.

22. The optical coupling device as claimed in claim 21, wherein the second waveguide further comprises:
at least two second taper areas disposed between the second coupling area and the at least two second transmission areas;
wherein a width of the at least two second taper areas gradually decreases from a width corresponding to a width of the at least two second transmission areas to a width corresponding to a width of the second coupling area.

* * * * *